Dec. 25, 1962 J. E. OSTLINE 3,070,664
CALLING PARTY IDENTIFICATION SYSTEMS
Filed Dec. 4, 1959
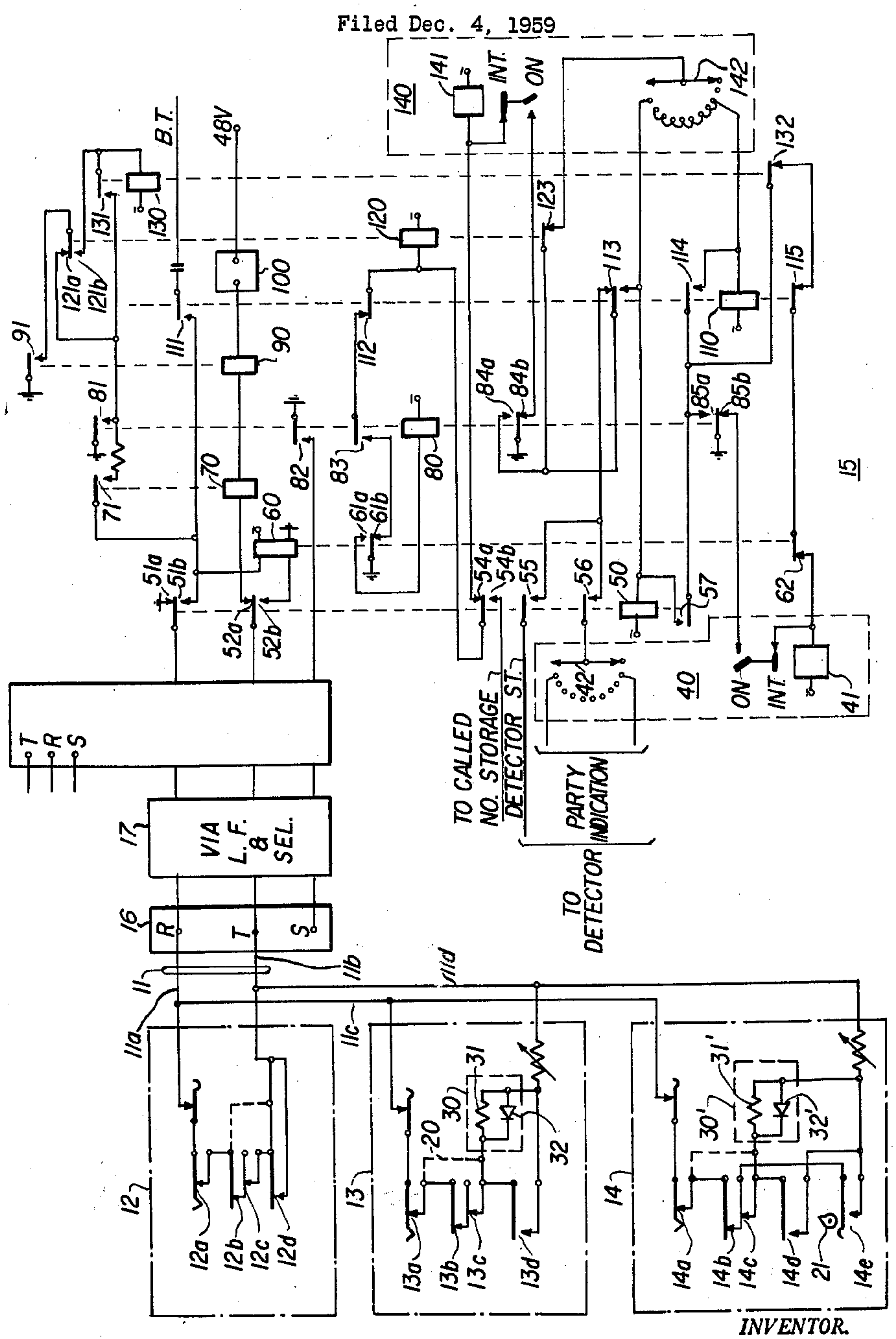
INVENTOR.
John E. Ostline, deceased
by Mattie A. Ostline, executrix
by C. A. Gullbrandson
Atty.

3,070,664
Patented Dec. 25, 1962

3,070,664

CALLING PARTY IDENTIFICATION SYSTEMS

John E. Ostline, deceased, late of Elmwood Park, Ill., by Mattie A. Ostline, executrix, Elmwood Park, Ill., assignor to Automatic Electric Laboratories, Inc., a corporation of Delaware Filed Dec. 4, 1959, Ser. No. 857,310
5 Claims. (Cl. 179—17)

The present invention pertains to automatic telephone systems and particularly to the automatic identification of a calling station over two conductors of a party line.

A feature of this system is the identification of the calling station on a two-party line without either a substation ground connection or a spotter cam. Further, the two-party identification system of this invention may be expanded for ten-party identification without substation ground by the addition of spotter cam mechanisms to the additional substations.

In the past, a spotter cam operated in conjunction with the conventional impulse cam has been provided at the substation in party line systems of this type to close an identification contact at a predetermined point in the dial cycle to send ground potential over one side of the line loop to a ticketer to identify the calling station.

Elimination of the spotter cam mechanism simplifies and improves the substation equipment while the requirement of substation ground has long been recognized as a complication in party line identification. In some locations it is difficult or even impossible to establish a relable ground connection and it is therefore most advantageous to have a system wherein station identification is accomplished over a two-conductor loop with motivating potential emanating from the central office.

Accordingly, it is a primary object of this invention to provide automatic calling station identification on a party line without substation ground connection.

Another object of this invention is to provide calling station identification on a two-party line without the use of either a spotter cam mechanism or substation ground.

Another object of the present invention is to provide calling station identification on a party line without the use of a spotter cam mechanism which may be expanded to include substations with spotter mechanisms.

Still another object of this invention is to provide an automatic telephone system with party line identification without substation ground by slight modification of existing substation equipment.

These and other objects of the present invention will be apparent to one skilled in the art from reading the following detailed description in conjunction with the drawing which is a schematic representation of a party line in a telephone system embodying the present invention.

The identification system of the present invention operates over the conventional two-conductor line loop, after the calling party has dialled the first two digits of an access code to reach the ticketer. The third digit of the access code, a zero, controls the station identification circuits.

Upon reaching the ticketer, the potential in the loop circuit is reversed and a marginal register relay serially connected with a pulse control relay is inserted into the circuit.

A pulse storage means is operated by the dial to register a series of digital impulses attendant upon its operation and a marking means is controlled by the register relay to record the serial position at which it ascertains a predetermined resistance in the loop circuit for the control relay. The calling party is therefore identified by the selective insertion of a resistance into the loop circuit which is accomplished by the insertion of a control circuit or "spotter pack" in series with one of the two line conductors at the substation.

The "spotter pack" comprises a unidirectional conductor connected in parallel with a predetermined resistance. During battery reversal the unidirectional conductor is non-conducting so that insertion of the "spotter pack" inserts the predetermined resistance into the loop circuit, while during normal operation of the dial, the unidirectional conductor is conducting and thereby eliminates any effect of the "spotter pack" resistance upon pulsing of the line relay.

In the drawing, a telephone line 11, comprising two conductors **11*a* and 11*b*, is shown serving three parties represented by the substation dial spring assembly diagrams 12, 13, and 14**. Each of the spring arrangements for the illustrated substations is different to demonstrate the compatibility of the identification circuit and "spotter pack" of this invention and as will be subsequently described, to illustrate two-party identification without substation ground or a spotter cam.

For two-party identification without a spotter cam, the substation spring pile-ups are as shown in the representative substations 12 and 13. Additional parties may be added to the line and identified by the identification circuit of this invention by the addition of substation equpment having a dial spring assembly in accordance with that illustrated at 14.

The party identification circuit indicated generally at 15 is included in a ticketer such as that shown in a system of the type disclosed in the U.S. patent application Serial No. 628,474, filed December 3, 1956, by J. E. Ostline et al., and is accessed over the line 11 through conventional line and cut-off relays represented at 16 and line-finders and selectors represented at 17, to complete a calling line loop circuit including the conductors **11*a* and 11*b*. The identification circuit 15** is connected outgoing to a detector of the above-mentioned system which records the calling party information as ascertained thereby.

The circuit 15 includes a party register switch 40, a switch relay 50, a pulsing relay 60, a control relay 70 for the pulsing relay 60, a holding relay 80, a marginal party-register switch control relay 90, connected in series with the control relay 70, an intercept relay 110, a control switch relay 120, a cut-off relay 130, and a control register switch 140.

The identification means of this invention is predicated upon the reversal of the normal potential in the loop circuit at the central office. Extension of the loop circuit to the ticketer actuates a sensing means, including the pulsing control relay 70 and the party-register switch control relay 90 which are connected in series in the line loop between a ground potential and a battery 100. The sensing means tests the resistance of the loop circuit during each impulse attendant upon the dialling of the identification digit. After extension of the loop circuit to the central office and initial seizure of the identification circuit, a register means and a control means are operated in parallel to store the impulses of the dialled identification digit. A recording means is conditioned by the sensing means responsive to a predetermined resistance in the line loop to mark the serial position of the register means when the predetermined resistance is first present. The control means includes a stepping switch 140 which is incrementally advanced by each pulse in the line loop without regard to resistance therein to store the impulses of the dialled digit and to actuate reset means and switching means for extending the call in response to the receipt of ten impulses indicative of correct dialling of the identification digit or to actuate intercept means in response to the receipt of less than ten impulses.

The identification of a calling party is initiated upon the extension of a call to the ticketer where the circuit is seized and the normal polarity of the loop circuit is reversed. A sensing means, including the pulsing control relay 70 and the register relay 90, is actuated upon seizure of the identification circuit through the shunt springs which completes a low resistance conducting path when the setting member of the dial is in the normal position. Actuation of the sensing means operates a pulsing relay 60 to condition pulsing means for operation responsive to the digital impulses generated by the return of the dial to its normal position. The pulsing means operates register means including the party-register switch 40 and control means including the switch 140. Operation of the relay 60 also actuates conditioning means including the holding relay 80 and the control switch relay 120 to prepare a recording circuit for operation, responsive to the sensing means ascertaining a predetermined resistance in the loop circuit for stopping the register switch at the first instance of said predetermined resistance. Operation of the recording means does not affect the operation of the control means so that it continues to step once for each impulse generated by the dialling of the identification digit and selectively actuates either a switching circuit to mark the stopped position of the register switch and extend the call to subsequent equipment in the switch train, or an intercept circuit, depending upon whether or not by the proper identification digit is dialled by the calling party. In this manner the calling station is identified in terms of a series of impulses generated by the dialling of a predetermined identification digit by creating a predetermined resistance in the line loop following a predetermined impulse and recording the serial position thereof.

For an example of the operation of the identification means, assume that the calling party at the station 12 has dialled the first two digits of an access code to extend the calling loop to the ticketer at the control office where the normal potential is reversed and the identification circuit is seized over a loop circuit from ground through the normally closed contact 51*a*, the normally closed contact 52*a*, and the relays 70 and 90 to the battery 100. Upon the calling party pulling the dial off normal to dial the identification digit, the pulse spring 12*a* and the shunt springs 12*b* and 12*c* are closed, as illustrated in the drawing, and the conversation shunt spring 12*d* is opened. With the springs at the substation 12 in their normal position, the loop circuit from the conductor 11*a* through the spring contacts 12*d* is closed to complete a low resistance conducting path and the pulsing control relay 70 and the marginal register relay 90 are operated. Operation of the relays 70 and 90 completes an operating circuit to the battery connected coil of the pulsing relay 60 from ground through the make contact 91, the break contact 121*a*, and the make contact 71. Operation of the pulsing relay 60 completes an obvious operating path through its make contact 61*a* to the slow-to-release holding relay 80. Upon operation, the holding relay 80 prepares an operating circuit independent of the register relay 90 for the pulsing relay 60, through the make contacts 81 and 71; puts ground back on the control lead at the contact 82; prepares an operating path for the checking switch relay 120 through the make contact 83; temporarily extends ground through its make contact 84*a* to the wiper on the switch 141; and prepares an operating circuit for the magnet 41 of the party register switch 40 through its make contact 85*a*, the break contact 132, the break contact 115, and the break contact 62. The pulsing means of the identification circuit 15 is now prepared to respond to the dialling of the identification digit.

When the dial is pulled off normal, the shunt springs 12*b* and 12*c* are closed and the conversation shunt spring 12*d* is opened. With the first opening of the pulse spring

12*a*, the pulsing control relay 70 and the register relay 90 release. Release of the pulsing control relay 70 opens the operating circuit to the pulsing relay 60 and causes its release. Release of the pulsing relay 60 completes the prepared operating path for the checking relay 120 at the break contact 61*b* and completes the operating path for the magnet 41 of the register 40 at the break contact 62 to advance the switch wiper 42 one step to the first operative terminal, and completes an operating circuit to the magnet 141 on the control switch 140 to advance the wiper 142 one position to its first terminal which is an isolated terminal as shown in the drawing. Operation of the relay 120 prepares an operating path to the cut-off relay 130 at its make contact 121*b*, and removes ground potential from the switch wiper 142 at the break contact 123. Operation of the party register means and the checking switch means are thus initiated and the marking means, switching means and intercept means are conditioned for subsequent operation.

When the pulse spring 12*a* closes at the end of the first impulse, the pulsing control relay 70 reoperates over the loop circuit and closes its make contact 71 to operate the pulse relay 60 independently of the register relay 90 over the operating circuit prepared and held by operation of the holding relay 80. Due to the absence of any additional resistance in the line loop, the marking relay 90 reoperates in series with the relay 70 and closes its make contact 91. Closing of the contact 91 completes an operating circuit for the cut-off relay 130 which is operated and is locked up by its make contact 131. Operation of the cut-off relay 130 opens the operating circuit to the rotary magnet 41 of the switch 40 at the break contact 132, thereby preventing further operation of the party-register switch in response to the subsequent impulses in the line loop. Operation of the relay 60 forwards holding ground to the relay 80 through the contact 61*a* in the conventional manner and the release of the pulsing relay 60 attendant upon the subsequent pulse operates the rotary magnet 141 of the switch 140 to advance the wiper 142. The operating circuit for the rotary magnet 41, having been opened by the operation of cut-off relay 130, cannot be operated by the pulses following the release and reoperation of the marking relay 90. Each subsequent pulse of the dial identification digit will similarly supply holding ground to the holding relay 80 and step the wiper 142 to hold the entire identification circuit, with the exception of the switch 140, in a static condition. It will be noted that after two sequential operations, the operaion of the marking relay 90 has no effect on the circuit.

During the interdigital pause following the last impulse of the identification digit, the relays 70 and 60 will be held operated, thereby maintaining an operating circuit for the holding relay 80 and removing operating ground from the checking switch relay 120 which de-energizes and closes a conducting path at the break contact 123 to extend ground through the contact 84*a* to the wiper 142 of the switch 140.

If the proper identification digit, zero, has been dialled, the wiper 142 is on the last terminal and the ground is extended to operate the switch relay 50. Operation of the switch relay 50 opens its contacts 51*a* and 52*a* and closes its make contacts 51*b* and 52*b* to disconnect the identification circuit 15 and insert the pulsing relay 60 in the loop circuit in place of the relays 70 and 90 and to return the potential therein to normal; opens the operating circuit for the magnet 141 at the contact 54*a*, and prepares an operating path to the called number storage equipment (not shown) at the make contacts 54*b*; forwards ground to start the detector (not shown) at the make contact 55 through the contact 113 on the relay 110; and completes a latching circuit through make contact 57 and contact 85*a*.

If the calling party has not dialled the prescribed identification digit zero, the wiper 142 is positioned on one of the intercept contacts of the switch 140, all of which are multipled to the battery connected intercept relay 110. Upon release of the checking switch relay 120 during the interdigital pause, the relay 110 is operated from the ground potential extended to the wiper 142 to actuate the intercept function of the identification circuit as follows: the make contact 111 closes to prepare a path for busy tone back to the conductor 11*a*; the break contact 112 opens the operating path for the relay 120; the transfer contact 113 removes the source of ground potential from the wiper 42 on the party-register switch 40 and completes an operating path for the switch relay 50; the make contact 114 closes a locking circuit and the break contact 115 opens the operating path to the rotary magnet 41 on the party register switch 40. Operation of the switch relay 50 under these conditions is effective only to disconnect the circuit 15, insert the pulsing relay 60 in the loop circuit and thereby return the polarity to normal by the closure of the make contacts 51*b* and 52*b*. Closure of the make contacts 54*b*, 55 and 56 is ineffective due to the removal of ground therefrom by the operation of the break contact 112 on relay 110 and the transfer contact 113. Closing contacts 51*b* and 52*b* completes a path over the loop circuit for busy tone over the contacts 111 and 51*b* to the calling party receiver.

If the proper identification digit has been dialled, polarity of the loop circuit is returned to normal, as above described, with the pulsing relay 60 operated over its battery and ground connections. The holding relay 80 is operated over the contact 61*a* on the relay 60, and the switch relay 50 is held operated from ground over the contact 85*a* on the relay 80 and its own locking contact 57. The equipment is now in condition to extend the switch train by release and operation of the pulsing relay 60 responsive to subsequently dialled digits over the loop circuit.

When the calling party hangs up, either after completion of his call or upon receiving busy tone due to improper dialling, the pulsing relay 60 is released, thereby opening its contact 61*a* and closing its contacts 61*b* and 62 to prepare the identification circuit for restoration to its normal condition preparatory to identifying subsequent calls. A predetermined period of time after the opening of its operating circuit at contact 61*a*, the holding relay 80 releases to: open contact 81 to remove ground from the alternate operating circuit for the pulsing relay 60; remove ground from the control lead at the contact 82; open, at its contact 83, the ground path to the switch 140 and to the called number storage; remove ground from the switch wiper 142 at contact 84*a*; and complete a homing circuit for the switch 140 through its off normal and interrupter springs; remove holding ground from the switch relay 50 and the intercept relay 110 at contact 85*a*; and at contact 85*b* complete a self-interrupting homing circuit to the party-register switch 40 through its off normal and interrupter contacts.

Release of the switch relay 50 disconnects the detector, the called number storage, and the wiper 42 from ground, and reverses the line loop connections at the contacts 51*a* and 52*a*. Release of the relay 110: removes busy tone from the line conductor at the contact 111; prepares operating paths to the relay 120 and the switch 140 at the contact 112; opens the alternate operating path for the switch relay 50 at the contact 113; and prepares an operating path for the switch 40 at the contact 115. With the release of the holding relay 80 and the attendant operations as above described, the identification circuit 15 returns to readiness for identification of the calling party on subsequently dialled calls.

In accordance with the foregoing description, operation of the party-register switch 40 is dependent upon the sequential operation of the marginal register relay 90. The first operation of the register relay 90 conditions the identification circuit 15 to respond to any impulses of the identification digit while the second operation of the register relay actuates a disconnect means to fix the position of the wiper on the party-register switch by rendering the register switch magnet non-responsive to the subsequent impulses received by the circuit. The register relay 90 is dependent upon low-resistance conditions in the line loop for its operation due to its marginal characteristics and its series connection with the pulsing relay 70.

The identification circuit therefore, when it is placed in combination with means for selectively placing a predetermined resistance in the line loop, is an effective calling party identification means.

In accordance with the present invention, the stations on a two-party line are differentiated by the inclusion of a "spotter pack" in one substation while the other substation is left unaltered. The presence of the "spotter pack" which includes a predetermined resistance and a unidirectional conductor connected in parallel, permits operation of the register relay in the identification circuit 15 only once, thereby conditioning the register means and the checking means for operation by the dialled impulses, but not operating the cut-off relay 130, with the result that the register switch 40 stores the entire ten impulses of the dialled identification and operation of the switching relay 50 during the interdigital pause, as described above, extends ground over the wiper 42 and the tenth terminal of the party register switch to mark the calling party as that associated with the tenth terminal.

Referring to the drawing, and particularly to the spring pile-ups represented at 13 and 14, the "spotter packs" 30 and 30' respectively are serially connected between the line lead and the shunt springs. Since the "pack" 30 used with the non-spotter spring pile-up is identical with those, such as 30' used with the spotter dial spring pile-ups, only the "pack" 30 will be described in detail.

The "pack" 30 comprises a resistor 31 and a diode, or unidirectional conductor 32, connected in parallel with each other and in series with the shunt springs and the line lead. The unidirectional conductor 32 is so constructed that during normal polarity in the loop circuit, it presents a low-resistance conducting path between the conductors 11*a* and 11*b* through the impulse spring 13*a* and the shunt springs 13*b* and 13*c*. Reversal of battery in the line loop, such as takes place upon seizure of the identification circuit 15 in the ticketer, renders the diode 32 non-conducting, thereby including the resistor 31 in the conducting path of the line loop to create a predetermined resistance therein.

In the two-party identification system of the invention, the first party, represented by the square 12, is identified, as described in detail above. The second station, represented by the square 13, is identified in a similar manner. After the calling party at the second station has dialled the first two digits of an access code to extend the loop circuit to the central orifice and seize the identification circuit 15 in the ticketer, the relays 70 and 90 of the sensing means are energized over a low-resistance conducting path including the conductor 11*a*, the lead line 11*c*, the hookswitch, the pulse contact 13*a*, the transmitter circuit 20, the closed conversation contact 13*d*, the lead line 11*d*, the conductor 11*b* through the contact 52*a*, and the relays 70 and 90 to the battery 100, while the dial is in the normal position. Pulling the dial off normal to dial the identification digit, opens low-resistance conducting path at the contact 13*d* and closes the shunt contacts 13*b* and 13*c* thereby leaving only the high resistance path through the "pack" 30 to complete the loop circuit. Due to the unidirectional conducting characteristics of the diode 32, the resistor 31 is connected in series into the conducting path to give the loop circuit a predetermined resistance and render the stopping means of the identification circuit 15 ineffective by preventing reoperation of the register relay 90. Consequently the party-register switch 40 and the checking switch 140 are advanced in parallel to the tenth terminal by the impulses of the identification digit where the position of the party register-switch wiper 42 is recorded to the detector, as described above.

To expand the two-party identification means for use with party lines having up to ten stations requires merely that each additional station be equipped with a spotter dial of the type described in detail in the U.S. Patent Number 2,581,697, issued January 8, 1952, to J. E. Ostline, and a "spotter pack." The spring contact arrangement of the additional stations is illustrated by the square 14 of the drawing. Each station includes the pulse contact 14*a*, the shunt contacts 14*b* and 14*c*, and the conversation contact 14*d* which correspond to those in the first two stations. In addition thereto, it includes a normally open spotter contact 14*e* and a spotter cam 21, which is driven in timed relationship with the pulsing cam of the dial mechanism to close the contact 14*e* at a predetermined interval in the impulse sequence generated by dialling the identification digit. With the spotter contact 14*e* open, and the "spotter pack" in series with the shunt springs, the loop circuit is a high-resistance circuit due to the resistor 32′, as described above, and the register relay 90 does not reoperate. The party-register switch 40 and the control switch 140, having been conditioned by the initial operation of the relays 70 and 90, operate in parallel and are advanced one step for each transmitted pulse of the identification digit. At a predetermined serial position in the pulse sequence, the spotter cam 21 closes the spotter contact 14*e* to shunt the "spotter pack" 30′, thereby returning the loop circuit to its low-resistance condition. The return of the loop circuit to a low-resistance condition reoperates the register relay 90 to actuate the stopping means of the circuit 15, whereby the party-register switch wiper 42 is fixed on a terminal indicative of the serial position in the impulse sequence at which the spotter contact was closed, i.e, if the contact 14*e* is closed following the fourth pulse the wiper 42 is held on the fourth terminal until the transmission of the tenth pulse, at which time ground is forwarded thereover to the detector.

In operation, a station such as that represented by the square 14 is assigned a designation in terms of the serial position of a pulse in the identification pulse sequence. Assume that the station 14 is identified by the fifth serial designation. Reversal potential in the loop circuit and conditioning of the identification circuit takes place upon extension of the call to the central office and while the dial is still in its normal position. Pulling the dial off normal inserts the "spotter pack" 30′, placing the loop circuit in a high resistance condition. The transmission of ten pulses, in accordance with the return of the dial to its normal position, operates only the relays 60 and 70 so long as the "spotter pack" remains in series in the loop circuit. During the first five impulses the party-register switch and the control switch are operated in parallel, as previously described, to advance the wipers 42 and 142 to their respective fifth terminals. Following the fifth transmitted impulse, the contact 14*e* is closed by the cam 21 to close a low-resistance conducting path in shunt with the "spotter pack" 30′ to place the loop circuit in a low-resistance condition and increase the magnitude of current flowing thereover. As the pulse contact 14*a* closes following the fifth impulse, the register relay 90 tests the loop circuit and is operated responsive to its low-resistance condition to fix the switch wiper 42 at the fifth terminal, which position is forwarded to the detector upon completion of the identification impulse series.

While the party line station identification means of this invention has been illustrated and described in a particular embodiment, various modifications and changes may be made therein, without departing from the spirit and scope of this invention as defined in the appended claims.

What is claimed is:

1. In an automatic telephone system, a central office; a two-conductor party line; a plurality of substations connected to the party line; a first loop circuit having a flow of current in a forward direction and including said two conductors completed upon initiation of a call from each of said substations; a unidirectional conductor in said loop circuit for conducting current thereover only in said forward direction; a resistor connected in said first loop circuit in parallel with said unidirectional conductor; dial means at each subscriber station variably operable away from a normal position and returnable thereto for interrupting said first loop circuit during the return to generate a series of digital impulses therein in accordance with the amount of operation of the dial means; a normally closed low-resistance shunt circuit in said first loop circuit effective to bypass said unidirectional conductor and said resistor; switch means operated by a predetermined series of digital impulses generated by said dial means to extend said first loop circuit to the central office; a second loop circuit, including said first loop circuit, established responsive to the extension of said first loop circuit to said central office; register means operated over said second loop circuit to register each pulse of an uninterrupted series following the completion of said second loop circuit; means operated by two sequential closures of said shunt circuit to record the number of operations of said register means; blocking means controlled by said dial means to hold said shunt circuit open while said dial means is in an off-normal position; and means controlled by said dial means to render said blocking means ineffective at a selected point in the return of said dial means, the selected point being indicative of the associated subscriber station whereby each calling station is identified by the number of impulses received by said register means prior to the second operation of said shunt means.

2. In an automatic telephone system, a central office; a two-conductor party line; a plurality of subscriber stations connected to the party line, each adapted to complete a first loop circuit over said two conductors upon initiation of a call therefrom; current control means at said substation to control the flow of current over said first loop circuit; dial means at each subscriber station variably operable away from the normal position and returnable thereto for interrupting said first loop circuit during its return to generate a series of digital impulses therein in accordance with the amount of operation of the dial means; shunt means including contact means operable by said dial means to render said current control means ineffective; switch means operated by a predetermined series of digital impulses to extend said first loop circuit to the central office; a second loop circuit including said first loop circuit, established responsive to the extension of said first loop circuit to said central office; register means operated over said second loop circuit to register each pulse of an uninterrupted series following the completion of said second loop circuit; means operated by two sequential completions of said shunt means to record the position of said register means; and means controlled by said dial means to open and close said shunt contact means at two selected positions during the operation of said dial means, the number of impulses between the first and second closures being indicative of the associated subscriber station whereby each calling station is identified by the number of impulses received by said register means after the first operation and prior to the second operation of said shunt means.

3. In an automatic telephone system having a central office, a plurality of subscriber stations connected to a two-conductor party line, each adapted to complete a loop circuit over said two conductors upon initiation of a call therefrom, and dial means at each subscriber station having a setting member variably operable away from a normal position and returnable thereto for interrupting the loop circuit during its return to generate a series of digital impulses therein in accordance with the amount of operation, station identification means actuated by the dialing of an access number to extend the loop circuit to the central office for identifying the calling station during the dialing of a succeeding identification digit comprising:

means in said central office for impressing a current of predetermined value in a reverse direction in said loop circuit; a control circuit at at least one of said substations for controlling the flow of current in said loop circuit, said control circuit including a unidirectional conductor for blocking the flow of current in said reverse direction and a resistor in said loop circuit connected in parallel with said unidirectional conductor for reducing the magnitude of current flowing in the reverse direction in said loop circuit; a normally closed low-resistance conducting path parallely connected in said loop circuit with said control circuit; cam means operated by the movement of said setting member off normal for opening said conducting path to insert said control circuit in said loop circuit; relay means in said loop circuit operated by said reverse current of said predetermined value; stepping means actuated by the operation of said relay means to register each pulse generated by said dial means; means responsive to the release and reoperation of said relay means to record the number of pulses registered by said stepping means; and means controlled by said dial means to close said low-resistance conducting path following transmission of a selected number of impulses to reoperate said relay means over said loop circuit.

4. In an automatic telephone system including a central office and a two-conductor party line having a plurality of subscriber stations each identified by a designated serial pulse position and each including contact means electrically connecting the two conductors upon initiation of a call to complete a loop circuit having current of a certain value and a predetermined direction flowing therein and a setting member variably operable from and returnable to a normal position to open the contact means during its return to the normal position a variable number of times to generate a series of impulses in accordance with the extent of its operation away from the normal position, and means controlled by operation of the setting member to extend the loop circuit to the central office, calling station identification means comprising: circuit means connected to the loop circuit by extension thereof to the central office to impress a current of predetermined greater magnitude flowing in a direction opposite to said predetermined direction over said extended loop circuit with said setting member in the normal position; sensing means operated by said predetermined current of greater magnitude and opposite direction over said extended line loop, said sensing means including a control relay and a marginal register relay connected in series in said loop circuit; a pulsing relay prepared by the simultaneous operation of said control relay and said register relay and operated in response to the pulses generated in the line loop by the setting member; means for registering each pulse generated by said setting member, said register means including a normally closed stepping circuit opened and closed by the operation and release of said pulsing relay; means responsive to the release and reoperation of said register relay to open said stepping circuit; means responsive to movement of said setting member away from the normal position to reduce the magnitude of the current in said extended loop circuit below said predetermined greater magnitude to release said register relay; means operated during the return of said setting member to restore the current in said extended loop circuit to said predetermined greater value following a selected opening of said contact means to reoperate said register relay; and marking means activated by said sensing means responsive to a predetermined number of pulses for marking the stopped position of said register means upon return of said setting means to the normal position, whereby the calling station on a party line is identified during the return of the setting member from a predetermined off-normal position by the changed condition of the loop circuit at a selected serial position in the resulting sequence of pulses.

5. In an automatic telephone system including a central office, a two-conductor party line including a plurality of subscriber stations; a loop circuit completed upon initiation of a call from one of said subscriber stations having current flowing in a predetermined direction; dial means at each subscriber station including contact means in said loop circuit and a setting member variably operable from and returnable to a normal position to open said contact means during its return to the normal position a variable number of times to generate a series of impulses in accordance with its operation; switch means operated by said dial means to extend the loop circuit to the central office; a current control circuit at least one of said substations including a unidirectional conductor and resistor connected in parallel, said unidirectional conductor adapted to conduct current in said predetermined direction; circuit means connected to the line loop by extension thereof to the central office to cause a current of predetermined magnitude to flow in a reverse direction over said extended loop circuit; sensing means actuated by said predetermined current over said extended loop circuit, said sensing means including a register relay having a minimum operating requirement equal to said predetermined current magnitude; register means prepared by initial operation of said register relay to be advanced one step responsive to each opening of said contact means by said setting member; means responsive to the release and reoperation of said register relay to hold said register in a stopped position; means responsive to the movement of said setting member away from the normal position to connect said current control circuit in said extended loop circuit for reducing the current magnitude therein below said predetermined value; shunt means selectively closed during the return of said setting member to render said circuit control means ineffective at a selected point in said series of generated impulses to reoperate said register relay; and marking means actuated by said sensing means responsive to a predetermined number of openings of said contact means by said setting member for marking the stopped position of said register means upon return of said setting member to the normal position, whereby the calling station on a party line is identified by movement of the setting member a predetermined amount from its normal position, and changing the condition of the extended loop circuit at a predetermined serial position in the resulting sequence of pulses, each station being assigned a different serial position.

References Cited in the file of this patent

UNITED STATES PATENTS

| | | |
|---|---|---|
| 2,013,171 | Peterson | Sept. 3, 1935 |
| 2,524,773 | Deakin | Oct. 10, 1950 |
| 2,603,712 | Ostline | July 15, 1952 |
| 2,619,546 | Myers | Nov. 25, 1952 |
| 2,901,544 | Collins | Aug. 25, 1959 |
| 2,946,853 | Peterson | July 26, 1960 |